United States Patent
Takahashi et al.

(10) Patent No.: US 6,713,915 B2
(45) Date of Patent: Mar. 30, 2004

(54) MOTOR

(75) Inventors: Masashi Takahashi, Nagano (JP); Noboru Otsuki, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/259,232

(22) Filed: Sep. 27, 2002

(65) Prior Publication Data

US 2003/0062796 A1 Apr. 3, 2003

(30) Foreign Application Priority Data

Oct. 2, 2001 (JP) ........................................ 2001-306960

(51) Int. Cl.⁷ .................... H02K 5/04; H02K 5/16; H02K 3/18
(52) U.S. Cl. ........................ 310/89; 310/90; 310/254
(58) Field of Search ............................ 310/89, 90, 254

(56) References Cited

U.S. PATENT DOCUMENTS

| | | | | |
|---|---|---|---|---|
| 2,817,026 A | * | 12/1957 | Robinson | 310/88 |
| 4,843,269 A | * | 6/1989 | Shramo | 310/208 |
| 5,877,574 A | * | 3/1999 | Molnar | 310/215 |
| 6,020,660 A | * | 2/2000 | Wright | 310/68 R |
| 6,462,446 B2 | * | 10/2002 | Cook et al. | 310/91 |
| 6,487,769 B2 | * | 12/2002 | Ketterer et al. | 29/596 |

FOREIGN PATENT DOCUMENTS

| | | | |
|---|---|---|---|
| JP | 404117148 A | * | 4/1992 |
| JP | 404289747 A | * | 10/1992 |

* cited by examiner

Primary Examiner—Burton S. Mullins
Assistant Examiner—David W. Scheuermann
(74) Attorney, Agent, or Firm—Hogan & Hartson, LLP

(57) ABSTRACT

A motor has a stator assembly, a rotor assembly having a rotary shaft, a bearing unit that rotatably supports the rotary shaft with respect to the stator assembly, and a case body that generally houses the stator assembly and the rotor assembly. The case body includes a bottom surface section, a recessed concave section that is located radially inside the bottom surface section and concaves inwardly in an axial direction at an area opposing an excitation coil of the stator assembly, and a bearing retaining section that is formed radially inside the recessed concave section, wherein at least one part of the bearing retaining section is located more interior in the axial direction than the bottom surface section.

17 Claims, 5 Drawing Sheets

MOTOR

BACKGROUND OF THE INVENTION

1. Field of the Invention

The present invention relates to motors that are used in industrial equipment and home electric appliances. More particularly, the present invention relates to the structure of motors and motor cases that shorten the overall length of the motors.

2. Description of Related Art

FIGS. 6 and 7 show a typical conventional motor M. The conventional motor M is generally structured with a stator S disposed in a motor case 100 and a rotor R that is freely, rotatably supported within the stator S. The stator S is equipped with a stator core 5 and excitation coils 6. The stator core 5 has a plurality of salient poles disposed at generally equal angles and radially extending toward the center, and each of the excitation coils 6 is wound in generally the same width on each of the salient poles. The stator core 5 is provided with a shaft hole at its center through which a rotary shaft 2 composing the rotor R is passed. The shaft hole is provided opposite to a driving magnet 3 that is affixed to an outer circumference of the rotary shaft 2 of the rotor R.

The rotary shaft 2 is freely, rotatably supported by a pair of bearings 41 and 42 that are provided at both end sides, respectively, of the motor case 100. One end of the rotary shaft 2 outwardly protrudes from the motor case 100 to form an output shaft section 2*a*.

The motor case 100 has a cup shape, and is formed from a first case 110 that houses the stator S and a part of the rotor R, and a second case 120 that retains the bearing 42 and covers an opening section of the first case 110. A bearing retaining section 114 is formed in the first case 110 in a manner that the bearing retaining section 114 outwardly protrudes in the axial direction from a bottom surface section 112 of the first case 110. The bearing retaining section 114 retains the first bearing 41 on its inside. Also, a bearing retaining section 124 is similarly formed in the second case 120 in a manner that the bearing retaining section 124 outwardly protrudes in the axial direction from a bottom surface section 122 of the second case 120. The second bearing 42 is retained inside the bearing retaining section 124.

In recent years in particular, the miniaturization of industrial equipment and home electric appliances has been greatly advanced, and in this connection, there is a greater demand in reducing the size of motors themselves. However, since the conventional motor M described above has a structure in which the bearing retaining section 114 protrudes from the bottom surface section 112, which elongates the overall length of the motor M. This prevents miniaturization of the motor M.

Conventionally, some measures to shorten the overall length of motors have been proposed. For example, after the excitation coils 6 are wound on the salient poles of the stator core 5, end faces of the excitation coils 6 are press-formed, or the number of turns of the excitation coils 6 is reduced, to lower the height of the excitation coils 6 in the axial direction.

However, when the end faces of the excitation coils 6 are to be press-formed, additional work is required after the excitation coils 6 are wound, and there is a possibility of severing the excitation coils 6. When the number of turns of the excitation coils 6 is reduced, there may be a problem in that the designed motor performance may not be attained.

SUMMARY OF THE INVENTION

The present invention has been made in view of the problems described above. Accordingly, the present invention relates to providing motors that can realize miniaturization of motors by shortening the overall length of the motors.

In accordance with an embodiment of the present invention, a motor includes a case body having a bottom surface section, a recessed concave section that is located inside the bottom surface section in a radial direction and recedes inwardly in an axial direction at a location opposite to an excitation coil provided within the case body, and a bearing retaining section that is formed inside the recessed concave section in the radial direction, wherein at least one part of the bearing retaining section is located inside in the axial direction than the bottom surface section.

In accordance with the present invention, the bearing retaining section is disposed inside the recessed concave section in the radial direction that is located opposite to the excitation coil and inside the bottom surface section of the case body the radial direction of. As a result, the bearing can be located more interior in the axial direction than the bottom surface section. Consequently, the amount of protrusion of the bearing retaining section that may protrude from the bottom surface section of the case body is suppressed to a small level, and thus the overall length of the motor can be shortened.

Also, in the present invention, the excitation coil may be wound in a manner that the number of turns of the excitation coil becomes greater toward outside in the radial direction such that an end face of the excitation coil is inclined inwardly in the axial direction, and the recessed concave section may have a sloped surface section that is concaved inwardly in the axial direction and extends along the inclined end face of the excitation coil.

In one embodiment, each of the salient poles of the stator core may be formed from a base section that is located on the outer circumferential side of the stator core, an extended section that is to be located opposite to the driving magnet on the inner circumferential side of the stator core and a rib section that connects the base section and the extended section. The width of the base section may be wider in the circumferential direction than the width of the extended section. By using such a structure of the stator core, the configuration of excitation coil whose number of turns becomes greater in the radial direction toward the outer periphery of the stator core can be more rationally achieved.

With the structure described above, the excitation coil can be wound on the salient pole of the stator core in the amount necessary to provide its intended function without creating waste spaces in the circumferential direction, and the end face of the excitation coils become inclined in the axial direction. As a result, the recessed concave section of the case body can be inwardly concaved along the inclined end faces of the excitation coils, and spaces along the axial direction of the case body can be effectively utilized to reduce the amount of protrusion of the bearing retaining section. As a consequence, while the necessary number of turns for the excitation coil is maintained, the overall length of the motor can be shortened.

In accordance with an embodiment of the present invention, the stator core may be divided in the circumferential direction for each of the salient poles; in other words, the stator core may be formed from a plurality of divided cores that are circularly arranged in a ring shape. The excitation coil may be wound on each of the divided cores. By so doing, the coil winding work on each of the salient poles becomes simpler, and a motor with good volume efficiency as a whole and high occupancy rate of the excitation coils can be structured.

Furthermore, in accordance with an embodiment of the present invention, the case body may have two sides that interpose the stator core in the axial direction, and each of the sides may have the bottom surface section, the recessed concave section and the bearing retaining section, and each of the bearing retaining sections may retain a bearing, wherein at least a part of each of the bearings may be located more interior in the axial direction than the bottom surface section.

With the structure of described above, at least a part of each of the bearings retained at both of the two sides in the axial direction of the case body is located more inside in the axial direction than the bottom surface sections. As a result, the overall length of the motor can be further shortened.

In accordance with another embodiment of the present invention, a motor includes a case body containing a rotor core, wherein the case body includes a bottom surface section that closes an opening section of the case body, a recessed concave section that is located radially inside the bottom surface section and recedes inwardly in an axial direction at a location opposite to an excitation coil provided within the case body, and a bearing retaining section that is formed radially inside the recessed concave section, wherein at least one part of the recessed concave section is located more interior in the axial direction than the excitation coil.

In accordance with the embodiment described above, the recessed concave section that is formed opposite to the excitation coil is provided inside in the radial direction of the bottom surface section, and the bearing retaining section is disposed inside in the radial direction of the recessed concave section. As a result, the amount of protrusion of the bearing retaining section that may protrude from the bottom surface section of the case body is reduced to a small level, and thus the overall length of the motor can be shortened.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Figure 6:
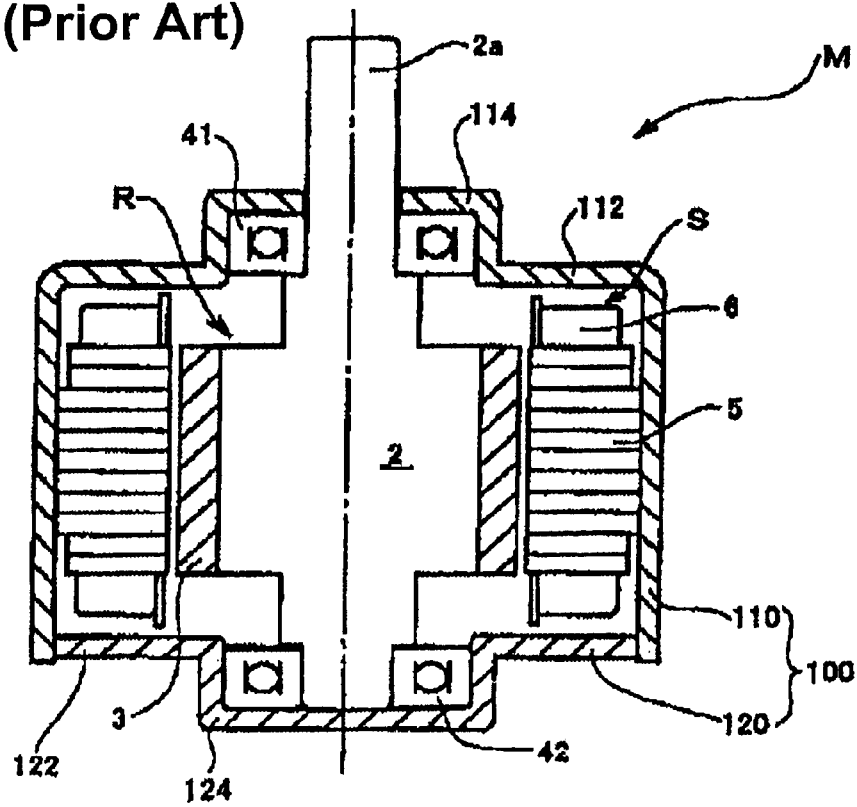
FIG. 6 shows a longitudinal cross section of a conventional motor.
Figure 7:
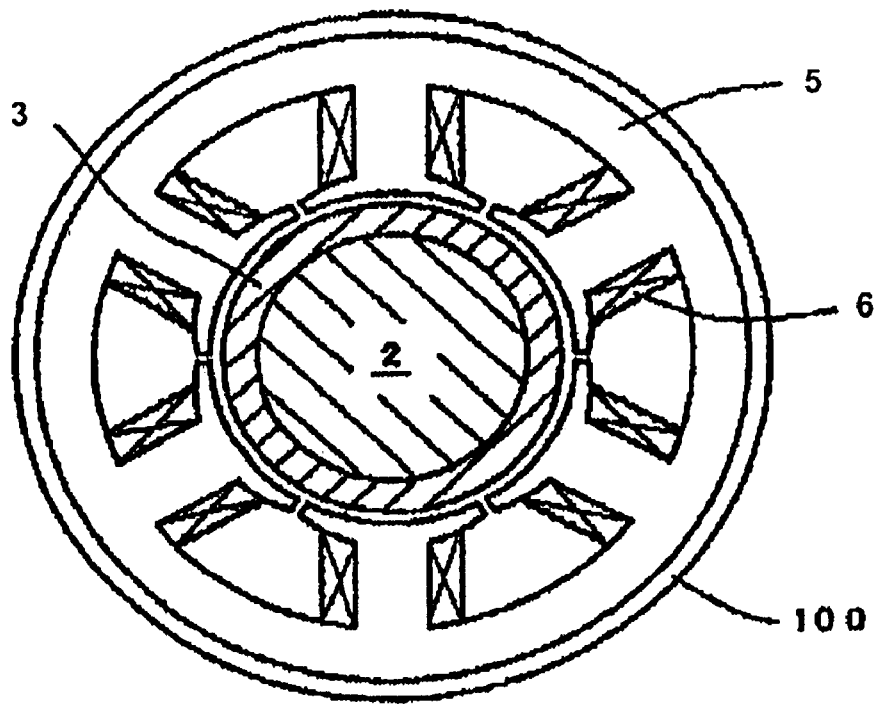
FIG. 7 shows a transverse cross section of the conventional motor.

Motors in accordance with embodiments of the present invention will be described with reference to FIGS. 1–5. It is noted that components of the motors of the present embodiments that have functions common to the conventional motor shown in FIGS. 6 and 7 will be indicated by the same reference numbers as those of the conventional motor in the following description.

Figure 1:
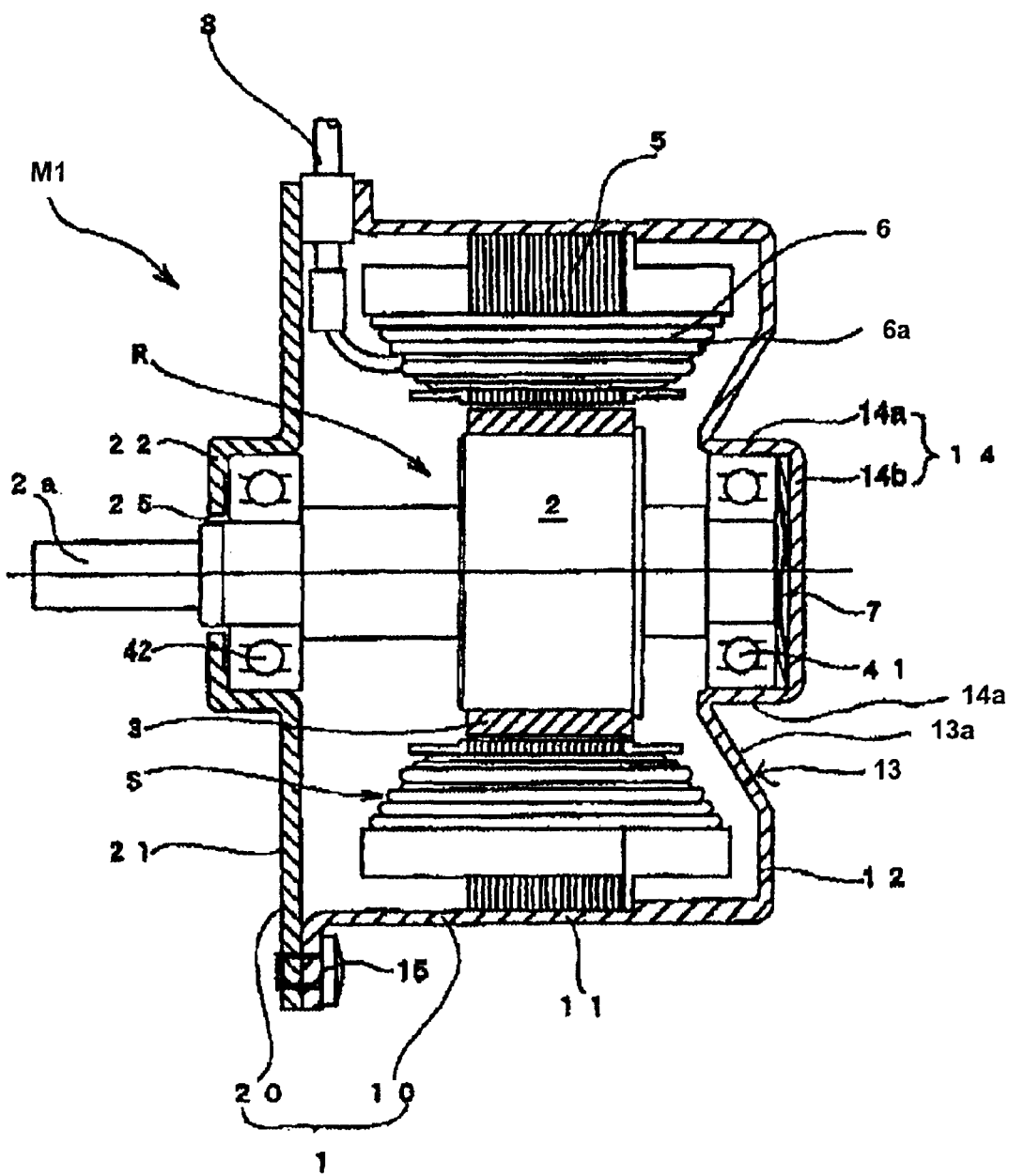
FIG. 1 shows a longitudinal cross section of a motor in accordance with a first embodiment of the present invention.
Figure 2:
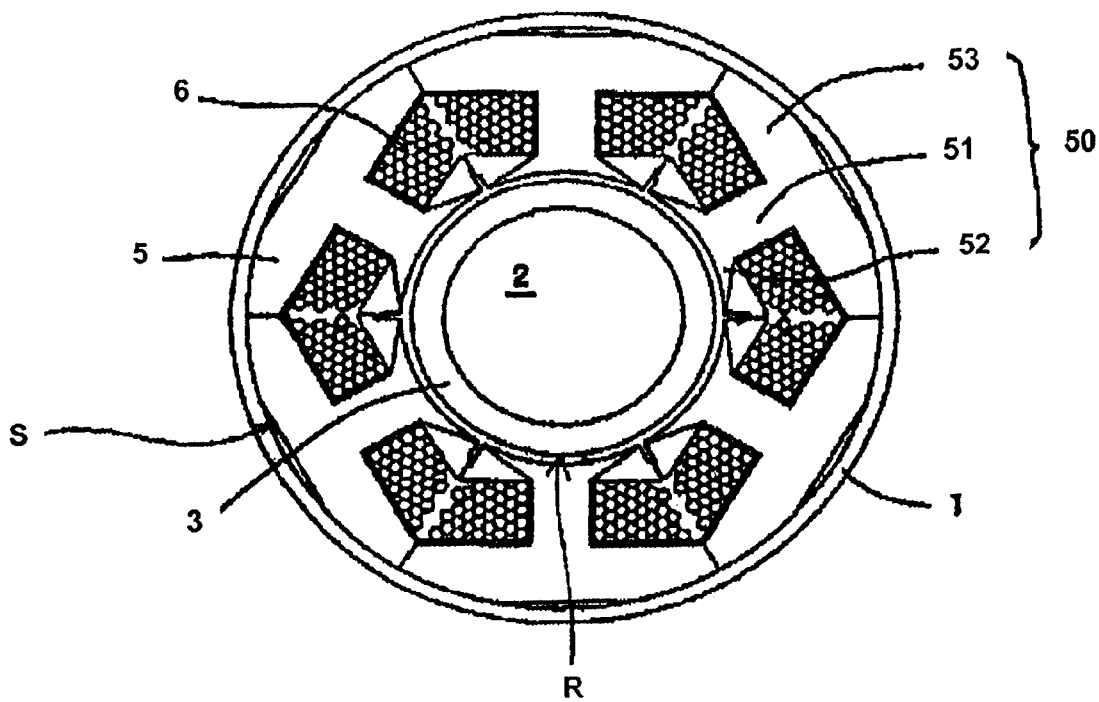
FIG. 2 shows a longitudinal cross section of the motor in accordance with the first embodiment of the present invention.
Figure 3:
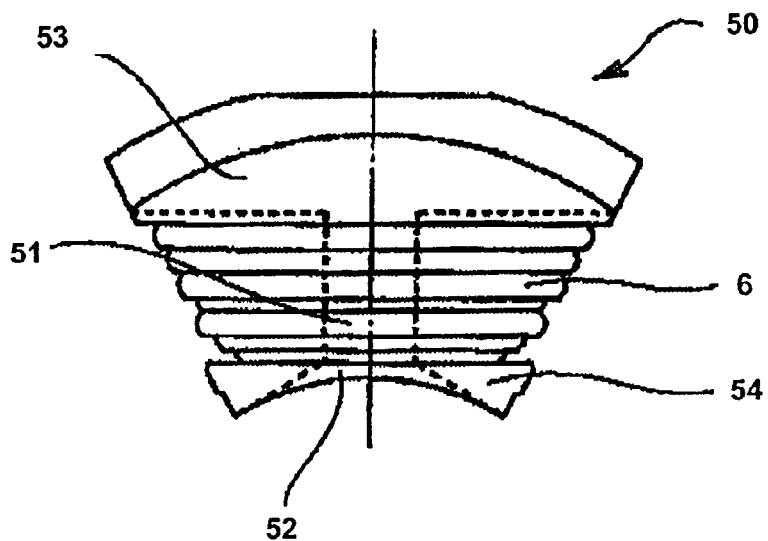
FIG. 3 shows a plan view of one of divided cores in accordance with the first embodiment of the present invention.

FIG. 1 shows a longitudinal cross section of a motor M1 in accordance with a first embodiment of the present invention. The motor M1 is an inner rotor type motor that is generally formed from a stator assembly S and a rotor assembly R that is disposed inside the stator assembly S in a rotatable, drivable manner.

Referring to FIG. 1, the rotor assembly R is equipped with a rotary shaft 2 having a plurality of stepped sections, and a driving magnet 3 that is attached to an outer circumferential surface of a largest diameter section of the rotary shaft 2. The rotary shaft 2 is rotatably supported at its both end sections by first and second ball bearings 41 and 42. More specifically, an inner ring of the first ball bearing 41 that is retained in a bearing retaining section 14 (to be described below) of the case body 1 is mounted on one end section of the rotary shaft 2 on the right side in the figure. An inner ring of the second ball bearing 42 is mounted on the other end section of the rotary shaft 2 on the left side in the figure. Thus, the rotary shaft 2 is rotatably supported on the first and second ball bearings 41 and 42. In this embodiment, the other end section of the rotary shaft 2 protrudes outwardly in the axial direction from the case body 1 to form an output shaft section 2a.

The stator assembly S in the first embodiment includes a stator core 5. The stator core 5 is equipped with base sections 53 that are disposed in the circumferential direction along an inner wall surface of the case body 1, a plurality (six in the present embodiment) of salient poles 51 disposed at equal angle spaces in the circumferential direction and radially extending toward the center of the motor from the respective base sections 53, and extended sections 52 that are formed at inner end sections of the respective salient poles 51. An excitation coil 6 is wound on each of the salient poles 51. In the embodiment, each of the extended sections 52 has a generally triangular or trapezoidal cross sectional shape, whose narrower sides connect to the respective salient poles 51. Also, the stator core 5 is provided at its central area with a shaft hole that allows insertion of the rotor assembly R. Inner circumferential surfaces of the respective extended sections 52 are disposed opposite to an outer circumferential surface of the driving magnet 3 through a specified gap there between.

In the first embodiment, the stator core 5 is formed from a plurality of divided cores 50 that are divided for the respective salient poles 51. The divided cores 50 are circularly arranged to form the stator core 5. Each of the divided cores 50 is formed from a plurality of core plates stacked in layers in the axial direction. Each of the core plates has the salient pole 51, and the extended section 52 and the base section 53 that are formed at inner end and outer end, respectively, of the salient pole 51. Generally entire surface of the divided cores except magnetic condensation surfaces thereof that are disposed opposite to the driving magnet 3 are contained and covered within an insulator 54, and the excitation coils 6 are wound on the rib sections of the salient poles 51 through the insulator 54.

In this embodiment, the extended sections 52 are formed on the inner side of the stator core 5 and the base sections 53 are formed on the outer side of the stator core 5. As the extended sections 52 are circularly arranged to form an outer ring portion and the base sections 53 are circularly arranged to form an inner ring portion, the width in the circumferential direction of the base section 53 is longer than the width in the circumferential direction of the extended section 52. In accordance with the first embodiment, the excitation coil 6 is wound in a manner that the number of turns of the excitation coil 6 becomes greater in an aligned manner toward the outer side in the radial direction, and the number of turns of the excitation coil 6 is increased by effectively using the limited spaces to the extent that the excitation coils 6 wound on the adjacent divided cores 50 would not interfere with one another. When the excitation coils 6 are wound in a manner that the number of turns of each of the excitation coil 6 becomes regularly greater in an aligned manner toward the outer side in the radial direction, both end faces in the axial direction of the excitation coils 6 are inclined inwardly to define inclined surfaces 6a, as indicated in FIG. 1.

As described above, the case body 1 contains the stator core 5 on which the excitation coils 6 are wound and the rotor assembly R, a pair of the ball bearings 41 and 42 that support the rotary shaft 2 except the output shaft section 2a, and the case body 1 in accordance with the present embodiment is formed from a first case 10 and a second case 20.

More specifically, the first case 10 is in a generally cup shape with a cylindrical section 11 that encircles the stator core 5 and a bottom surface section 12 that is provided in a manner to close one end side (on the right side in FIG. 1) in the axial direction of the cylindrical section 11. Inside the bottom surface section 12 in the radial direction, which opposes the excitation coils 6 in the axial direction, is provided a recessed concave section 13 having an inclined surface 13a that is angled and inwardly concaved in the axial direction. Further, a bearing retaining section 14 that is continuous with the recessed concave section 13 is located inside the recessed concave section 13 in the radial direction, and the first ball bearing 41 is mounted within the bearing retaining section 14. Therefore, the recessed concave section 13 is formed from the inclined surface section 13a that is inclined in the direction in which the recessed concave section 13 inwardly concaves in the axial direction and a cylindrical retaining section 14a (to be described below) that forms the bearing retaining section 14. In the present embodiment, the first and second cases 10 and 20 are formed by steel plates that are press-processed, respectively.

Due to the fact that the excitation coil 6 is wound such that the number of turns of the excitation coil 6 increases towards the outer circumference in the radial direction, both end faces of the excitation coil 6 in the axial direction are inwardly inclined to form inclined surfaces 6a. The first case 10 is inwardly concaved in the axial direction along the inclined surface 6a of the excitation coil 6. As a result, the recessed concave section 13 having a generally conical configuration having an outer circumference section and an inner circumferential section that recedes inwardly with respect to the outer circumferential section, and a surface area on the inner circumferential section side of the recessed concave section 13 is used to continuously form the bearing retaining section 14.

More specifically, the inner circumferential section of the recessed concave section 13 is outwardly bent at an acute angle in the axial direction to form a protruded cylindrical retaining section 14a, and a plane retaining section 14b that extends in the radial direction is provided at an end section in the axial direction of the cylindrical retaining section 14a. The plane retaining section 14b may slightly protrude in the axial direction from the bottom surface section 12.

The first ball bearing 41 is retained on the inside of the bearing retaining section 14, in a manner that a major part of the ball bearing 41 is positioned to be inside in the axial direction with respect to the bottom surface section 12. In other words, since the area on the inner circumferential side of the recessed concave section 13 is used to form the bearing retaining section 14, the bearing retaining section 14 can be formed more inside and receded from the bottom surface section 12 in the axial direction, such that a major part of the first ball bearing 41 can be present in a space that is formed between the inclined surfaces 6a of the excitation coils 6 and the rotary shaft 2. As a result, the amount of protrusion of the bearing retaining section 14 from the bottom surface section 12 is reduced to a small level, and accordingly the overall length of the motor M1 is shortened by the corresponding amount. Moreover, the excitation coil 6 is wound in a manner that the number of turns thereof increases toward the outer circumference in the radial direction to increase its occupancy rate. This coil winding structure would secure a sufficient motor efficiency. In particular, by winding the excitation coil 6 in a plurality of layers in an aligned winding manner, the coil occupancy rate further increases and a more smooth inclined surface 6a is formed.

Reference numeral 7 in FIG. 1 denotes a wave washer that gives a preliminary pressure to the ball bearing 41. Also, reference numeral 8 denotes an external terminal that connects to a motor electrical power line for supplying electrical power to the excitation coils 6. The external terminal 8 is lead out of the motor case through a hole provided in the cylindrical section 11 of the first case 10.

The second case 20 is generally in a plate shape, and is attached to an opening section of the first case 10 by binding members 15 such as screws, bolt and nuts or the like. A bearing retaining section 22 that retains the second ball bearing 42 is formed in the central area of the second case. The bearing retaining section 22 outwardly protrudes in the axial direction from the bottom surface section 21. Also, the bearing retaining section 22 is provided at its central area with a center hole 25 through which the output shaft section 2a of the rotary shaft 2 is passed and protruded out.

As described above, with the motor M1 in accordance with the first embodiment of the present invention, the recessed concave section 13 is formed in the first case 10 in an area opposing the excitation coils 6. As a result, the amount of protrusion of the bearing retaining section 14 from the bottom surface section 12 of the first case 10 is reduced to a small level, and thus the overall length of the motor M1 can be shortened.

Moreover, the excitation coil 6 is wound in a manner that the number of turns of the excitation coil 6 decreases toward the outer circumference in the radial direction such that the end faces in the axial direction of the excitation coils 6 define the inclined surface 6a, and the inclined surface section 13a of the recessed concave section 13 is inwardly concaved in the axial direction and extends along the inclined surface 6a. As a result, the excitation coil 6 can be wound on the stator core 5 in a required amount without substantially creating waste spaces in the circumferential direction, and the spaces in the axial direction can be effectively utilized such that the amount of protrusion of the bearing retaining section 14 can be reduced. As a consequence, while the required number of turns of the coils is secured, the overall length of the motor M1 can be shortened.

Furthermore, in accordance with the present invention, the stator core 5 can be formed from a plurality of divided cores 50. This enables to provide a motor structure, which facilitates the coil winding work to wind the coil on each of the salient poles 51, and which has a good volume efficiency of the motor as a whole and a high occupancy rate of the excitation coils 6.

Figure 4:
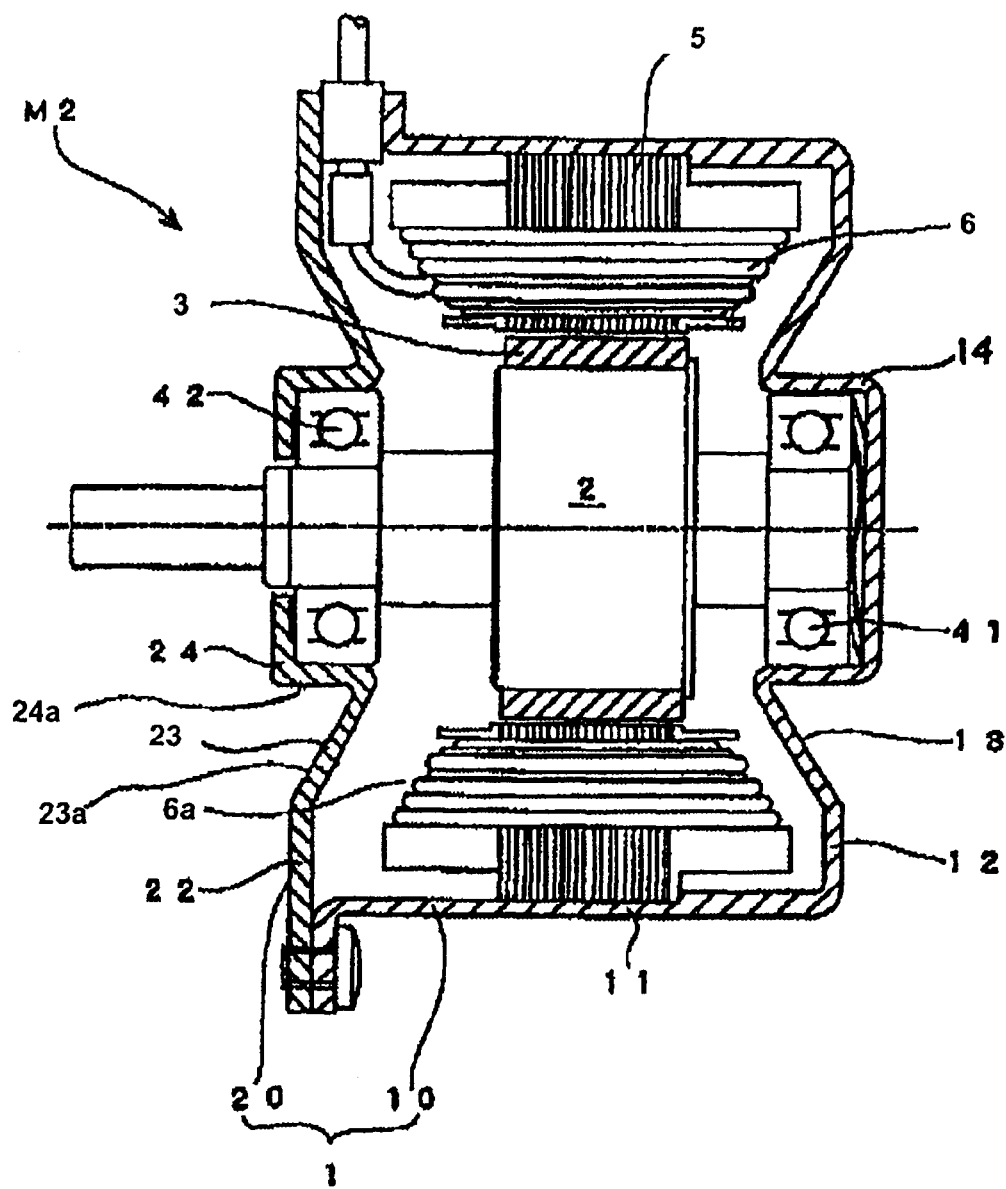
FIG. 4 shows a longitudinal cross section of a motor in accordance with a second embodiment of the present invention.

FIG. 4 shows longitudinal cross section of a motor in accordance with a second embodiment of the present invention. Components of the second embodiment shown in FIG. 4 common to the first embodiment shown in FIG. 1 are indicated by the same reference numbers, and duplicative descriptions therefore will be omitted.

Referring to FIG. 4, a second case 20 is equipped with a bottom surface section 22, a recessed concave section 23 that is located inside the bottom surface section 22 in the radial direction and that is concaved inwardly of the motor M2 (inwardly in the axial direction), and a bearing retaining section 24 that is formed inside the recessed concave section 23 in the radial direction. The bottom surface section 22, the recessed concave section 23 and the bearing retaining section 24 may be formed in one piece. The recessed concave section 23 includes an inclined surface section 23a in an area that opposes an inclined surface 6a of the excitation coils 6, and that is inwardly concaved in the axial direction and extends along the inclined surface 6a, and a bearing retaining section 24 that is located inside the inclined surface section 23a. The second ball bearing 42 is retained on the inside of the bearing retaining section 24. Accordingly, like the first embodiment, the recessed concave section 23 is formed from the inclined surface section 23a that is inclined in the direction in which the recessed concave section 23 inwardly concaves in the axial direction and a cylindrical retaining section 24a that forms the bearing retaining section 24. The second ball bearing 42 is retained in the cylindrical retaining section 24a in a manner that at least one part of the second ball bearing 42 is located inwardly in the axial direction with respect to the bottom surface section 22. It is noted that a fist case 10 has the same structure as the first embodiment, and the first ball bearing 41 is retained in a bearing retaining section 14 of the first case 10.

In this manner, at least a part of each of the bearings 41 and 42, which are retained at both end sides in the axial direction of the case body 1, is located inwardly in the axial direction more than the respective bottom surface sections 12 and 22 of the case body 1. Accordingly, the overall length of the motor M2 can be further reduced.

Figure 5:
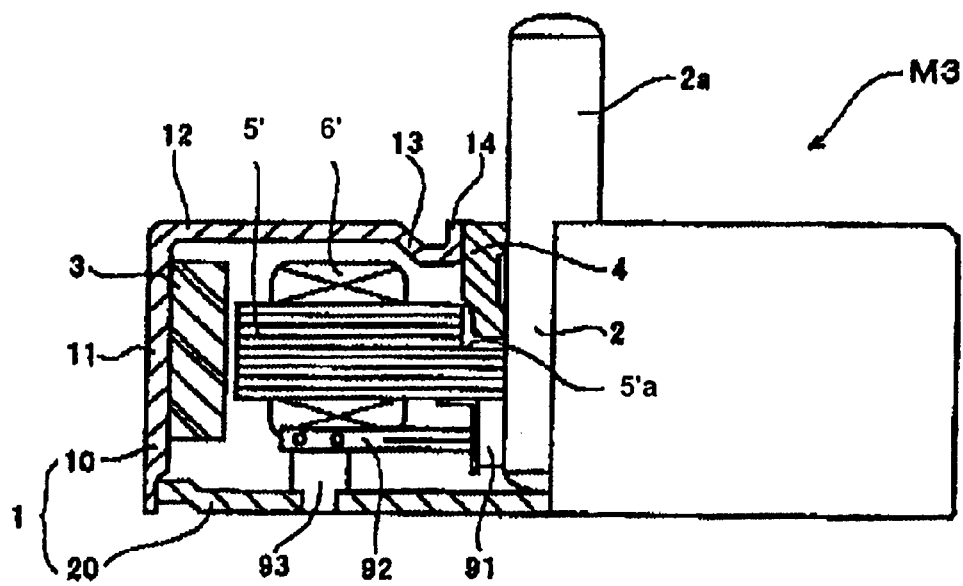
FIG. 5 shows a longitudinal cross section of a motor in accordance with a third embodiment of the present invention.

FIG. 5 shows a longitudinal cross section of a motor M3 in accordance with a third embodiment of the present invention. The motor M3 is a DC motor with brush, and is also an inner rotor type motor.

Referring to FIG. 5, the motor M3 includes a case body 1 that is formed from a first case 10 having an opening section on the lower side in the figure, and a second case 20 that closes the opening section of the first case 10. A ring-shaped magnet 3 is affixed to an inner circumferential surface of the first case 10. Also, a rotor core 5' fixedly mounted on a rotary shaft 2 is housed inside the case body 1, and excitation coils 6' are wound on the rotor core 5'. An outer circumferential surface of the rotor core 5' opposes an inner circumferential surface of the magnet 3 with an appropriate amount of gap provided between them. The rotary shaft 2 passes through the rotor core 5' and extends out of the case body 1. An upper end side (in the figure) of the rotary shaft 2 is rotatably supported in a manner rotatable together with the rotor core 5' by a sliding bearing 4 that is retained on the first case 10. A portion of the rotary shaft 2 that protrudes from the sliding bearing 4 and out of the motor M3 forms an output shaft section 2a. Also, a commutator unit 91 that is electrically connected to the excitation coils 6' inserted on lower end section of the rotary shaft 2. Further, a brush holder 93 that retains a brush unit 92 is affixed to the second case 20. The brush unit 92 contacts the commutator unit 91 to supply a predetermined current.

In the third embodiment, the first case 10 is in a generally cup shape with a cylindrical section 11, a bottom surface section 12, a recessed concave section 13 on the inner side of the bottom surface section 12 in the radial direction, and a bearing retaining section 14 that is formed on the inner side of the recessed concave section 13 in the radial direction. The recessed concave section 13 is provided in an area opposing the excitation coils 6' in the axial direction and is inwardly concaved in the axial direction. The bearing 4, which may be formed in one piece, includes two bearing sections that are separated from each other in the axial direction, and is retained inside the first case 10. More specifically, the bearing 4 is located more inside in the axial direction compared to the bottom surface section 12 of the first case 10. The lower end side of the bearing 4 extends into a cut section 5'a of the rotor core 5'. The excitation coils 6' of the present embodiment do not have a uniformly angled inclined surface like the excitation coils 6 of the aforementioned embodiment. However, each of the excitation coils 6' gradually lower its thickness from its end surface toward its inner side surface. The recessed concave section 13 is concaved into a space that is defined by the excitation coils 6', the rotor core 5' and the bearing 4. In other words, the inner surface of the case at the recessed concave section 13 extends in the axial direction lower than the top end surface (in the figure) of the excitation coils 6'. As a result, the amount of protrusion of the bearing retaining section 14 that may extend from the bottom surface section 12 of the first case 10 can be suppressed to a small level, and therefore the overall length of the motor M3 can be shortened.

Embodiments of the present invention have been described above. However, the present invention is not limited to those embodiments described above, and many modifications can be made without departing from the subject matter of the present invention.

For example, in the motors M1 and M2 in accordance with the first and second embodiments described above, the rotary shaft 2 is axially supported by the first and second ball bearings 41 and 42 that are retained at the bearing retaining sections 14 and 22 (in the first embodiment) or at the bearing retaining sections 14 and 24 (in the second embodiment). However, sliding bearings such as sintered oil retaining bearings may be used instead of the ball bearings.

Also, the stator core 5 that composes the motor M1 or M2 in the first or the second embodiment is formed from divided cores 50. However, a one-piece core may be used instead.

Furthermore, in the first through third embodiments, the present invention is applied to inner rotor type motors in which a rotor assembly R rotates on the inside of a stator assembly S. However, the present invention is also applicable to outer rotor type motors.

In accordance with the present invention, a case body is equipped with a bottom surface section and a recessed concave section that is formed inside the bottom surface section in the radial direction in an area opposing excitation coils, and a bearing retaining section is disposed inside the recessed concave section in the radial direction. As a result, the amount of protrusion of the bearing retaining section that may protrude from the bottom surface section of the case body is reduced to a small level, and thus the overall length of the motor can be shortened.

In accordance with the present invention, the end face in the axial direction of the excitation coil may be inwardly inclined to form an inclined surface, and the recessed concave section of the case body may be inwardly concaved along the inclined surface. As a result, the overall length of the motor can be shortened while securing the required number of turns of the coils without deteriorating the motor performance.

Also, in accordance with the present invention, the stator core may be formed from a plurality of divided cores that are divided for respective salient poles. The divided cores may be circularly arranged to form the stator core. An excitation coil may be wound on each of the salient poles on the divided cores independently. As a result, the coil winding work on each of the salient poles becomes simpler, and a motor with good volume efficiency as a whole and high occupancy rate of the excitation coils can be structured.

Furthermore, in accordance with another embodiment of the present invention, a motor includes a case body containing a rotor core, wherein the case body includes a bottom surface section that closes an opening section of the case body, a recessed concave section that is located inside the bottom surface section in the radial direction and concaves inwardly in an axial direction at a location opposite to an excitation coil provided within the case body, and a bearing retaining section that is formed inside the recessed concave section in the radial direction, wherein at least one part of the recessed concave section is located more interior in the axial direction than the excitation coil. As a result, the amount of protrusion of the bearing retaining section that may protrude from the bottom surface section of the case body is suppressed to a small level, and thus the overall length of the motor can be shortened.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor, comprising:
   a case body having a bottom surface section;
   a recessed concave section that is located inside the bottom surface section in a radial direction and concaves inwardly in an axial direction at an area opposing an excitation coil provided within the case body; and
   a bearing retaining section that is formed inside the recessed concave section in the radial direction, wherein at least one part of the bearing retaining section is located more interior in the axial direction than the bottom surface section,
   wherein the excitation coil is wound around a stator core such that the number of turns of the excitation coil becomes greater toward outside in the radial direction, and
   wherein the excitation coil wound around the stator core defines an inclined end surface that concaves in the axial direction, and the recessed concave section of the case body has an inclined surface section that inwardly concaves in the axial direction and extends along the inclined end surface of the excitation coil wound around the stator core.

2. A motor according to claim 1, wherein the stator core has a base section that is located on an outer circumferential side of the stator core, an extended section that is located on an inner circumferential side of the stator core and a rib section that connects the base section and the extended section, wherein the base section is wider in the circumferential direction than the extended section.

3. A motor according to claim 2, wherein the excitation coil is wound on the rib section of the stator core such that the number of turns of the excitation coil becomes greater from the extended section toward the base section in the radial direction.

4. A motor according to claim 1, wherein the stator core is formed form a plurality of divided cores, each of the divided cores having a salient pole, and the excitation coil is wound on each of the salient poles.

5. A motor according to claim 1, wherein the bearing retaining section is formed from a generally cylindrical retaining section extending outwardly in the axial direction from an inner bottom section of the recessed concave section.

6. A motor according to claim 1, further comprising at least one bearing that is retained at the bearing retaining section, a rotary shaft rotatably supported by the bearing, a driving magnet that is attached to an outer circumference of the rotary shaft, and a stator core affixed to the case body, wherein the excitation coil is wound on the stator core and spaced a distance in the redial direction from the driving magnet.

7. A motor according to claim 6, wherein the case body has two sides that interpose the stator core in the axial direction, each of the sides of the case body comprising the bottom surface section, the recessed concave section and the bearing retaining section, wherein at least one part of each of the bearing retaining sections is located more interior in the axial direction than the corresponding bottom surface sections, respectively.

8. A motor according to claim 6, wherein the case body has two sides that interpose the stator core in the axial direction, each of the sides comprising the bottom surface section, the recessed concave section and the bearing retaining section that retains a bearing, wherein at least a part of the bearing retained in each of the bearing retaining sections is located more interior in the axial direction than the corresponding bottom surface sections, respectively.

9. A motor having a stator assembly, a rotor assembly having a rotary shaft, a bearing unit that rotatably supports the rotary shaft with respect to the stator assembly, and a case body that generally houses the stator assembly and the rotor assembly, wherein the case body comprises:
   a bottom surface section;
   a recessed concave section that is located inside the bottom surface section in a radial direction and concaves inwardly in an axial direction at an area opposing an excitation coil of the stator assembly; and
   a bearing retaining section that is formed inside the recessed concave section in the radial direction, wherein at least one part of the bearing retaining section is located more interior in the axial direction than the bottom surface section,
   wherein the stator assembly includes a stator core and the excitation coil is wound around the stator core such that the number of turns of the excitation coil becomes greater toward outside in the radial direction, and wherein the excitation coil wound around the stator core defines an inclined end surface that concaves in the axial direction, and the recessed concave section of the case body has an inclined surface section that inwardly concaves in the axial direction and extends alone the inclined end surface of the excitation coil wound around the stator core.

10. A motor according to claim 9, wherein the stator core has a base section that is located on an outer circumferential side of the stator core, an extended section that is located on an inner circumferential side of the stator core and a rib section that connects the base section and the extended section, wherein the base section is wider in the circumferential direction than the extended section.

11. A motor according to claim 10, wherein the excitation coil is wound on the rib section of the stator core such that the number of turns of the excitation coil becomes greater from the extended section toward the base section in the radial direction.

12. A motor according to claim 9, wherein the stator core is formed form a plurality of divided cores, each of the divided cores having a salient pole, and the excitation is wound on each of the salient poles.

13. A motor according to claim 9, wherein the bearing retaining section is formed from a generally cylindrical retaining section extending outwardly in the axial direction from an inner bottom section of the recessed concave section.

14. A motor according to claim 9, wherein the rotary shaft has a driving magnet that is attached to an outer circumference thereof, and the stator assembly has a stator core affixed to the case body, wherein the excitation coil is wound on the stator core and spaced a distance in the radial direction from the driving magnet.

15. A motor according to claim 14, wherein the case body has two sides that interpose the stator core in the axial direction, each of the sides of the case body comprising the bottom surface section, the recessed concave section and the bearing retaining section, wherein at least one part of each of the bearing retaining sections is located more interior in the axial direction than the corresponding bottom surface sections, respectively.

16. A motor according to claim 14, wherein the case body has two sides that interpose the stator core in the axial direction, each of the sides comprising the bottom surface section, the recessed concave section and the bearing retaining section that retains a bearing, wherein at least a part of the bearing retained in each of the bearing retaining sections is located more interior in the axial direction than the corresponding bottom surface sections, respectively.

17. A motor, comprising:
   a case body containing a rotor core, wherein the case body comprises:
      a bottom surface section,
      a recessed concave section that is located radially inside the bottom surface section and concaves inwardly in an axial direction at an area opposing an excitation coil provided within the case body, and
      a bearing retaining section that is formed radially inside the recessed concave section, wherein at least a part of the recessed concave section is located more interior in the axial direction than the excitation coil,
   wherein the excitation coil is wound around a stator core such that the number of turns of the excitation coil becomes greater toward outside in the radial direction, and
   wherein the excitation coil wound around the stator core defines an inclined end surface that concaves in the axial direction, and the recessed concave section of the case body has an inclined surface section that inwardly concaves in the axial direction and extends along the inclined end surface of the excitation coil wound around the stator core.

* * * * *